Figure 1:
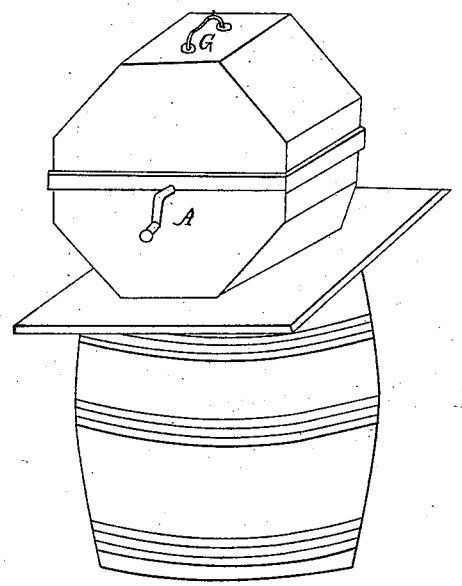
Figure 2:
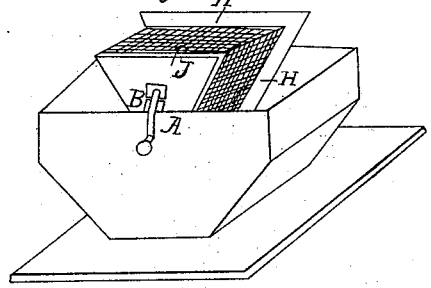
Figure 4:
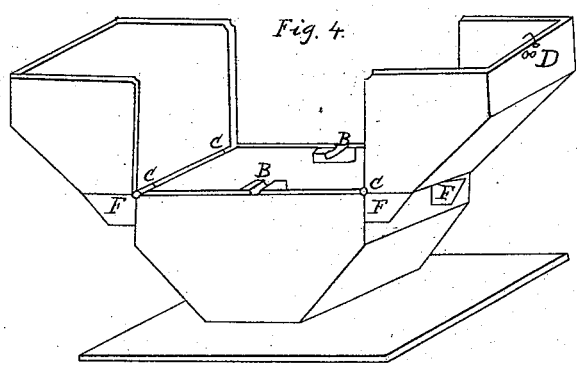
Figure 5:
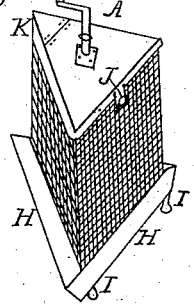
Figure 3:
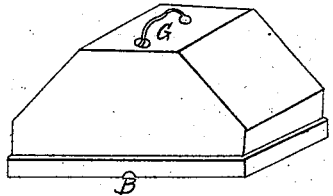

J. B. Creemer,
Coal Screen.

No. 13,699.          Patented Oct. 23, 1855.

Witnesses.
Edwin S. Deemer
William Burroughs

Inventor
John B. Creemer

UNITED STATES PATENT OFFICE.

JOHN B. CREEMER, OF PHILADELPHIA, PENNSYLVANIA.

COAL-SIFTER.

Specification of Letters Patent No. 13,699, dated October 23, 1855.

*To all whom it may concern:*

Be it known that I, JOHN B. CREEMER, of the city and county of Philadelphia, in the State of Pennsylvania, have invented a new and Improved Sieve for Sieving Coal, Ashes, and other Material and Called a Portable Revolving Sieve; and I do hereby declare that the following is a full, clear, and exact description of the construction and operation thereof.

The invention consists, of a prismatic, cylinder, sieve, of woven wire, joined to sheet iron ends, or hair, and wooden ends, as may be required. Upon one end, or the bottom, is turned a flanged disk, to prevent the ashes, or other matter from falling out while filling. In the center of the bottom, is a pivot, or gudgeon, which rests upon sockets, placed upon each side of the frame. Feet are attached to the corners, for the purpose of standing it up right while filling, or using as a scuttle. The other end, or top, forms a lid, secured by a hasp, so as to open and close at pleasure. In the center of the top, is a crank, which also serves as a handle, to carry it. When it is filled, it is placed in a horizontal position in the box, resting upon the crank, and gudgeon. The box consists of a square board of sufficient width to cover a barrel, a square hole is cut in the center of the size required, a frame is raised around the hole slanting at the ends, and of sufficient height to allow the sieve to turn free, and of the width required by the height of the sieve. A block of 1 inch or 1½ inches thick is placed on each side of the box for the sockets, to prevent the feet from striking the sides. Another frame is made of the same shape for the top, or lid, which are constructed in two ways as shown in drawing, the one opens with hinges and is parted in the center, the other is lifted off with a handle, I design using both as some prefer one and some the other.

The bottom, or lower part of the box is set upon a barrel intended for the ashes, or other matters, and the scuttle, or sieve is taken to collect the material to be sifted. It is then placed in the box and covered, and by a few revolutions of the crank, it completely separates the ashes from the coal, leaving the ashes at once in the barrel without further removing.

Figure (1) is the apparatus placed upon a barrel ready for use; Fig. (2) is the sieve in the box without a lid; Fig. (3) the loose top; Fig. (4) box with hinged top; Fig. (5) the sieve in upright position when used as a scuttle.

(A), crank or handle; (B), sockets; (C), hinges; (D), knobs and hook; (F), stays or bracket rests for hinged top; (G), handle for top; (H), dish; (I), feet; (J), hasp; (K), hinge of sieve.

I claim—

The dish H, and feet I, in combination with the screw operating as described, and for the purposes set forth.

JOHN B. CREEMER.

Witnesses:
 EDWIN H. DEEMER,
 WILLIAM BURROUGH.